United States Patent [19]
Hershey et al.

[11] Patent Number: 5,859,912
[45] Date of Patent: Jan. 12, 1999

[54] DIGITAL INFORMATION PRIVACY SYSTEM

[75] Inventors: John Erik Hershey, Ballston Lake; John Joseph Bloomer, Schenectady, both of N.Y.

[73] Assignee: General Electric Company, Schenectady, N.Y.

[21] Appl. No.: 620,142

[22] Filed: Mar. 22, 1996

[51] Int. Cl.$^6$ .................................................... H04L 9/00
[52] U.S. Cl. ............................... 380/42; 380/28; 380/50
[58] Field of Search .............................. 380/42, 44, 46, 380/50

[56] References Cited

U.S. PATENT DOCUMENTS

| | | | |
|---|---|---|---|
| 4,567,600 | 1/1986 | Massey et al. | 380/21 |
| 4,760,598 | 7/1988 | Ferrell | 380/44 |
| 4,771,458 | 9/1988 | Citta et al. | 380/42 X |
| 4,791,669 | 12/1988 | Kage | 380/46 |
| 4,797,921 | 1/1989 | Shiraishi | 380/44 X |
| 4,815,130 | 3/1989 | Lee et al. | 380/50 |
| 5,008,938 | 4/1991 | Freeburg et al. | 380/50 |
| 5,010,573 | 4/1991 | Musyck et al. | 380/28 |
| 5,365,588 | 11/1994 | Bianco et al. | 380/42 |
| 5,613,005 | 3/1997 | Murakami et al. | 380/44 X |

OTHER PUBLICATIONS

"An Apparatus for Pseudo–Deterministic Testing", Shridhar K. Mukund et al., IEEE (1995), pp. 125–131.

"A Hardware Test Pattern Generator for Deterministic ISCAS85 Test Sets", C. Dufaza et al., IEEE (1993), pp. 160–165.

"Cell–Based Test Design Method", Kazuhiro Sakashita et al., 1989 IEEE International Test Conference, pp. 909–916.

"Test Response Compaction Using Arithmetic Functions", Albrecht P. Stroele, IEEE 1996, 14th VLSI Test Symposium, pp. 380–386.

"Efficient Generation of Statistically Good Pseudonoise by Linearly Interconnected Shift Registers", William J. Hurd, IEEE Transactions on Computers, vol. C–23, No. 2, Feb. 1974, pp. 146–152.

"Data Transportation and Protection" by John E. Hershey, R.K. Rao Yarlagadda, Plenum Press, N.Y. (1986) pp. 59–61; 273–278.

*Primary Examiner*—Elizabeth L. Dougherty
*Assistant Examiner*—Paul D. Amrozowicz
*Attorney, Agent, or Firm*—Lawrence P. Zale; Marvin Snyder

[57] ABSTRACT

A system for determining a maximum length digital sequence is constructed by selecting a Mersenne Prime integer and a primitive polynomial having an ORDER equal to the Mersenne Prime integer. An arbitrarily selected mask m is either provided to the transmitter and receiver, or constructed, at either, or both. The mask is used to create a decimated M sequence, and work backwards to define a recursion rule vector r which is associated with another primitive polynomial corresponding to the decimated M sequence. This recursion rule vector r is used to create a new feedback shift register which produces a maximum length sequence. An initialization vector i is provided to the transmitter and receiver and used as an initial load of the shift register. A selected stage of this register is exclusive-ORed ("XORed") with each bit of a plaintext message to be sent to result in cipher text. At the receiver, the same process is performed with the same mask m, and initialization vector i, to create the same recursion rule vector r, and shift register. The same stage of this shift register is then XORed with the received ciphertext message to result in the original plaintext message.

5 Claims, 3 Drawing Sheets

DIGITAL INFORMATION PRIVACY SYSTEM

BACKGROUND OF THE INVENTION

1. Field of the Invention

The present invention relates to electronic communication of messages, and more particularly, to security of these messages.

2. Description of Related Art

Systems for creating random number have been used in the past in different areas. One such use is for a random number generator for games simulating random chance.

Another use is for protecting the content of transmitted messages from interception by other parties which are not intended to receive the messages. Although an algorithm used to encode a message can be widely known, a secret keying variable should provide sufficient protection such that unwanted access can be prevented or made sufficiently difficult to guess to generally deter timely access.

Security algorithms typically turn a message to be sent, known as "plain text" into an encoded form known as "cipher text". The method is "reversible" so that the cipher text can be returned to plain text by an intended receiver.

Complex schemes of encoding tend to be very difficult for an non-intended receiver to guess the key and decode the message. However, these complex schemes may require much processing time during the encoding stage, when the message is being processed before it is transmitted, and during the decoding stage, when the encrypted message is received and converted back into its original form. The encoding and decoding stages are referred to as the "traffic" stages, whereas, the preparation of elements used in encoding or decoding are referred to as the "setup" stage.

Since it is desirable to send the message shortly after it is created and to be able to read the message shortly after it is received, it is desirable to have a scheme which requires little processing during the traffic phases. It is also desirable to have a scheme which is difficult to decode without the key.

Another use of a pseudorandom sequence is for "code spreading" in which a message to be sent is merged with a "spreading code" which is a pseudorandom sequence of a much faster rate to produce a signal with considerably larger bandwidth. This large bandwidth signal is transmitted on the same frequencies as other signals and separated out by an intended decoder. This is referred to as code division multiple access (CDMA).

Therefore there is a need for a system to quickly and easily provide a pseudorandom bit sequence which may be for a variety of purposes.

SUMMARY OF THE INVENTION

A feedback second shift register is synthesized capable of producing a maximum length non-repeating pseudorandom sequence which may be used in a number of applications, such as a random number generator, a data encoding transmitter and receiver which protect the message from intervening listeners, and a spread spectrum communications system.

A first shift register is either constructed or simulated having a length, ORDER, being a Mersenne prime integer.

A primitive polynomial having a largest exponent equal to ORDER is selected.

Taps are connected to stages of the first shift register corresponding to exponents of the primitive polynomial, to be used as feedback.

An initialization vector i is loaded into the first register.

The shift register is run, and a dot product of each bit of an arbitrary mask m of length ORDER is performed with each corresponding stage of the first shift register. After ORDER shifts, the dot products are loaded into the shift register, saving the first dot product each time. The shift register is run until there are 2*ORDER first bits.

These first bits are used to solve ORDER simultaneous equations to determine a recursion rule vector $r=(r_1, r_2, r_3, \ldots r_{ORDER})$. The recursion rule vector then defines the taps for another feedback shift register of length ORDER which will produce the maximum length non-repeating pseudorandom sequence.

This new shift register may then be used as a random number generator, as part of a privacy transmitter and receiver, or as a pseudorandom code generator for spread spectrum communications system.

OBJECTS OF THE INVENTION

It is an object of the present invention to provide a novel code division multiple access message transmission system.

It is an object of the present invention to provide a feedback shift register producing a maximum length non-repeating sequence.

It is another object of the present invention to provide a data transmission system which requires a great deal of processing during a "setup" phase, making the message difficult to guess, while requiring little processing during the "traffic" phase (encoding or decoding of messages).

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Mersenne Prime numbers

A prime number of the form $2^p - 1$, where p is an integer, is a Mersenne prime number.

A "primitive polynomial", such as those defined in "Data Transportation and Protection" by John E. Hershey, R. K. Rao Yarlagadda, Plenum Press, New York, N.Y. (1986), pp. 59–61 has the distinction of having exponents which identify "taps" of a shift register with finite field linear feedback which would result in the maximum number of different shift register contents before repetition of the sequence. This is known as a maximum length pseudorandom sequence. For example, a shift register of length 3 has a maximum number of different bit value contents which is equal to $2^3-1=7$, before repetition. A primitive polynomial:

$$x^3+x^2+1$$

would suggest "exclusive ORing", ("XORing"), which is adding in modulo-2 fashion, the third stage of a shift register with the second stage of the shift register to result in the maximum number of different register contents (7) before repetition. The "taps" for this shift register are stages 3 and 2.

The shift register is set up to XOR at least two of the bit register contents to create a new bit value which is input to rightmost bit location, after all other bits have been shifted to the left. (An equivalent method would be to provide the new bit value into the leftmost bit position of the register, and shift all bits to the right, taking into account adjustment of the taps.)

Figure 1:
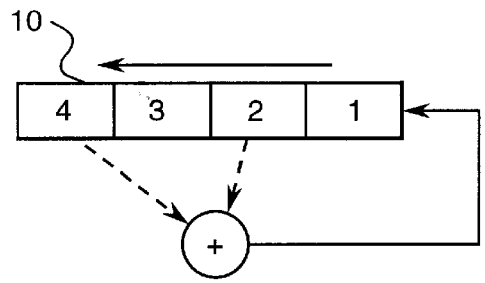
FIG. 1 is a simplified block diagram of a 4 stage shift register used in describing the present invention.

In FIG. 1, if a shift register 10 is shown having 4 bit positions, or stages, labeled 4, 3, 2, 1. It is designed to shift bits from right to left. It is also set up to XOR the contents of stages 2, 4 and put the result in stage 1, after the contents of 3 is shifted to 4; 2 is shifted to 3; and the contents of 1 is shifted to 2.

In this example, if one were to load "1 0 0 0" into stages 4, 3, 2, 1 respectively, the contents of these registers after each XOR and shift would be:

| initial state | 1000 |
|---|---|
| 1st shift | 0001, since XOR of 1 and 0 = 1; |
| 2nd | 0010 |
| 3rd | 0101 |
| 4th | 1010 |
| 5th | 0100 |
| 6th | 1000 |
| 7th | 0001 |

After 6 shifts the sequence repeats with the register contents being the same as the initial register contents. Similarly, the register contents after the 7th shift are the same as the register contents after the 1st shift, etc. Therefore, for a 4 stage shift register with an initial loading of "1,0,0,0" with taps 2, 4, results in 5 shift non-repeating sequence.

Figure 2:
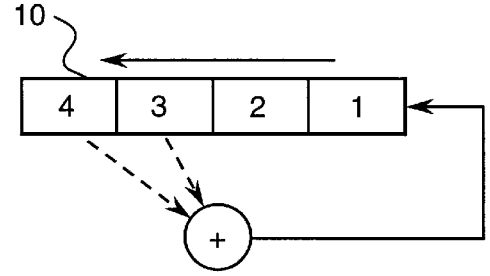
FIG. 2 is a simplified block diagram of another 4 stage shift register used in describing the present invention.

If one were to connect the shift register as shown in FIG. 2, with taps 3, 4, with the same initial value, the contents of shift register 20 would be:

| initial state | 1000 | 9th | 0101 |
|---|---|---|---|
| 1st shift | 0001 | 10th | 1011 |
| 2nd | 0010 | 11th | 0111 |
| 3rd | 0100 | 12th | 1111 |
| 4th | 1001 | 13th | 1110 |
| 5th | 0011 | 14th | 1100 |
| 6th | 0110 | 15th | 1000 |
| 7th | 1101 | 16th | 0001 |
| 8th | 1010 | 17th | 0010 |

This sequence begins to repeat after the 15th shift. This turns out to be a shift register feedback arrangement which results in the maximum number of non-repeating shift register values.

It also is true that if other primitive polynomials are selected and a shift register is set up with a number of stages matching the largest exponent, and the exponents also identifying stages to be XORed to determine each value to be shifted into the 1st stage, the number of different shift register values of the sequence before repetition is maximized.

If one were to construct a shift register having a length $2^P-1$ and taps described by a primitive polynomial of ORDER $2^P-1$, which must be a Mersenne prime number, the sequence of bit values after each shift of the highest stage would be known as a "M-sequence", as described in the above-mentioned Hershey publication on pp. 273–278.

If every Nth bit (where $1 \leq N < 2^{(2^P-1)}-1$) of the M-sequence were used, a decimated M-sequence would result. If one were to work backwards to determine a polynomial which corresponds to the decimated M-sequence, the result would be a primitive polynomial. The exponents of the new primitive polynomial would define the taps of another shift register of length $2^P-1$ which could produce this decimated M-sequence.

Therefore if one were to start with a primitive polynomial having an order of the polynomial being a Mersenne prime number, then other primitive polynomials, and shift registers, may be derived of the same order.

In a real implementation of the above theory, there may have to be a very long M-sequence, maybe on the order of $2^{31}$ entries required to produce a proper decimated M-sequence, based upon the N, which may become very time consuming. Therefore, a short cut may be derived from other properties of M-sequences.

It is known that by selecting any number of stages, greater than 1, and XORing them would result in the same M-sequence, but, perhaps, a different phase. This means that the same sequence would be produced by both, but one would be shifted with respect to the other. Using this fact, the processing time may be reduced.

The non-zero bits, corresponding to the non-zero values of the mask are modulo-2 added to result in a single bit. These steps are equivalent to a dot product of mask m and the current contents of the shift register. The register is then shifted and another dot product performed. These dot products are repeated until (2*ORDER) bits are acquired.

Figure 3:
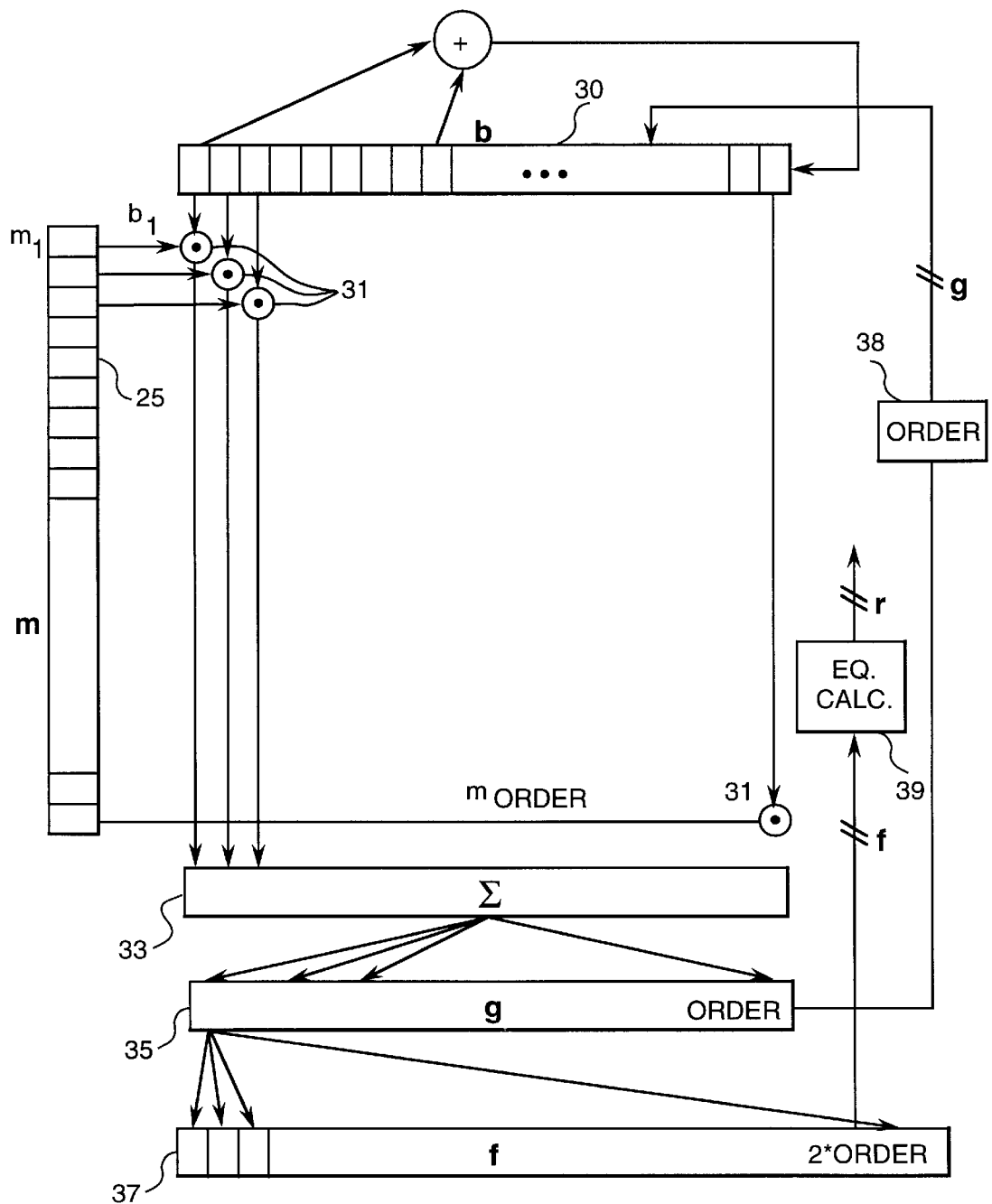
FIG. 3 is a simplified block diagram according to the present invention, showing a dot product portion of the system.

In FIG. 3, an apparatus according to the present invention used to derive a primitive polynomial is shown. After a primitive polynomial of the proper order has been selected, a feedback shift register having taps corresponding to the primitive polynomial is constructed, or simulated. The shift register is shown as 30.

A mask, $m=(m_1,m_2,m_3 \ldots m_{ORDER})$ has a length matching the ORDER of the primitive polynomial. Since the stages of register 30 which may be summed are arbitrary, the mask bits m may be arbitrary, provided that at least one of the bits m2 through $m_{ORDER}$ is non-zero. All that is required is that the encrypter, and the decrypter use the same mask m. Mask m, or bit sequences used to synthesize mask m, may be previously stored at both encrypter and decrypter, sent securely to encrypter or decrypter, or both, or portions used to create mask m be provided in this manner.

One method of creating mask m employs a keying variable, k, and an initialization vector, i used as an initial load of feedback shift register 30. The keying variable k may be provided by secure means at a period such as once a month to both encrypter and decrypter. Whereas, the initialization vector i may be sent as regular text without encryption as a preface of each message. Mask m must can be synthesized from k and i prior to encryption or decryption.

In the embodiment of FIG. 3, the order of the function is 31 with the shift register 10 having 31 stages, $(b_1, b_2, b_3, \ldots b_{31})$. Bit values $b_1$, $m_1$ are passed to AND unit 31 which produces a logical AND of the bit values. AND unit 31 produces a logical AND for all bit values of register 30 and mask 25. The results from AND unit 31 are passed to addition unit 33.

Addition unit 33 produces a modulo-2 addition of all bits of AND unit 31 to result in a single bit, $g_1$ for the 31 values of mask 25 and shift register 30.

Shift register 30 then performs a register shift to result in a new bit value pattern in shift register 30, and the above masking steps are repeated to produce a second bit $g_2$. This process of shifting and producing dot products is repeated until there are ORDER number of output bits, in this case, 31, which are stored in a reload register 35.

These 31 bits $g_1, g_2, g_3, \ldots g_{31}$ are passed from reload register 35 by loader 38 to load shift register 30 to provide 31 more g bits in the same fashion as above.

The first bit $g_1$ produced for each new loading of register 30 is also saved in equation data register 37. The first bit output after each loading is referred to as $f_i$, where i pertains to the index of each loading. This is repeated 2*ORDER times with 2*ORDER loadings in which 2*ORDER first bits $f=(f_1, f_2, f_3, \ldots f_{2*ORDER})$ are created.

The bits $(f_1, f_2, f_3, \ldots f_{62})$ are then used in solving the an ORDER number of simultaneous equations.

$$\sum_{i=1}^{ORDER} r_i f_{i+j} = f_{j+ORDER+1} \quad [1]$$

where $j=(0,1,2,\ldots, ORDER-1)$

With the order being 31, there are 31 simultaneous equations of the form:

$$\sum_{i=1}^{ORDER} r_i f_{i+j} = f_{j+32} \quad [2]$$

where $j=(0,1,2,\ldots, 30)$

This results in a single recursion rule vector $r=(r_1, r_2, r_3, \ldots r_{ORDER})$.

The recursion rule vector r defines a maximum length, non-repeating sequence in which each new term is calculated from previous terms. This then allows one to use the r to define taps of a new feedback shift register which will provide the maximum length of non-repeating bit sequence for the register of a given length.

Random Number Generator

By setting up a shift register similar to register 30, but with taps according to the recursion rule r, and monitoring one of the stages, or the feedback, one would result in the maximum length non-repeating sequence which may be used as a random number generator.

Byte Register Encoding/Decoding

Figure 4:
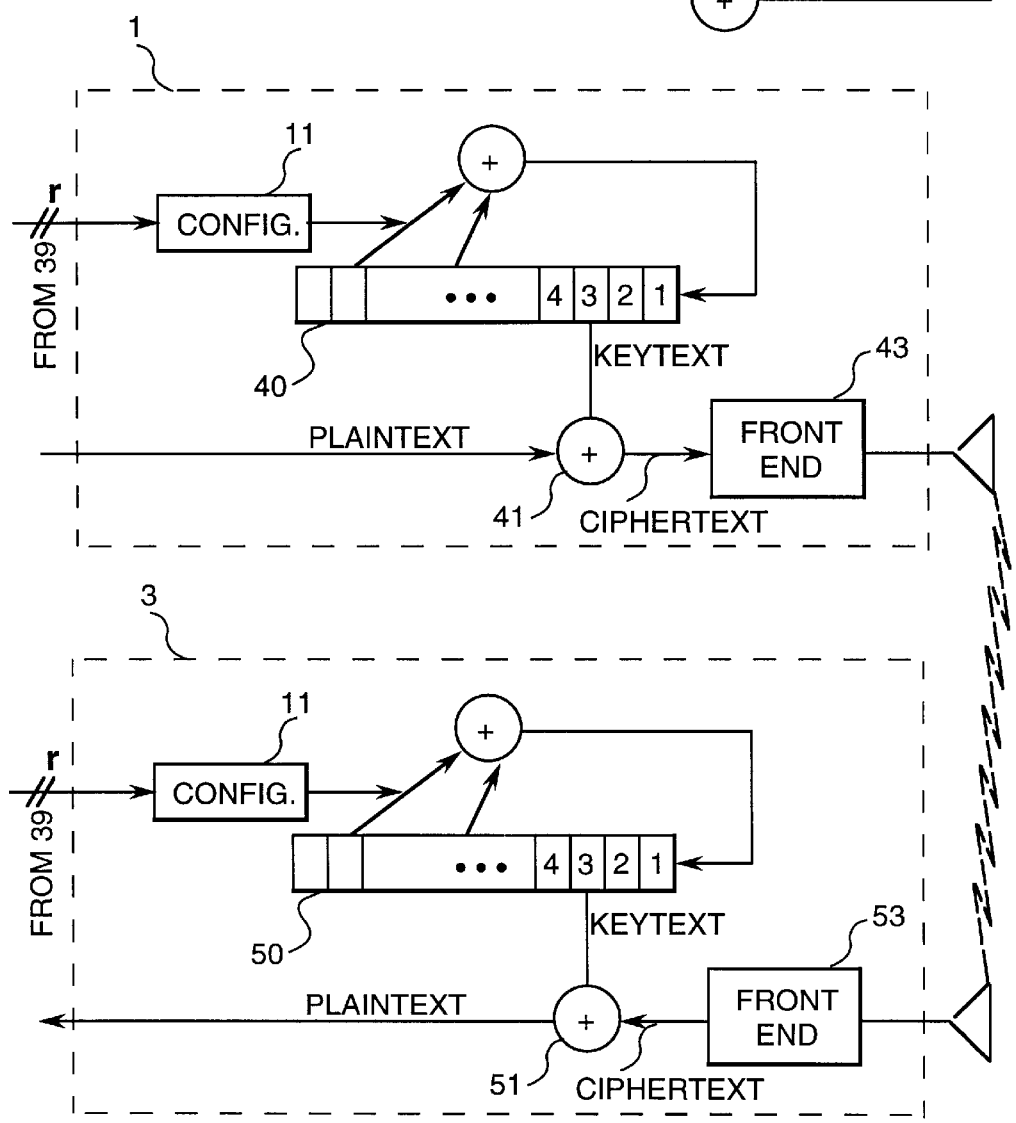
FIG. 4 is a simplified block diagram of a secure message encoding system employing a feedback byte register according to the present invention.

Since the recursion rule r is general, one may define a register in which each stage holds a larger number of bits, such as a byte, word, double word, disk sector, etc. of information. The same rules apply, as set forth in the above description. T In FIG. 4, taps of the register 40 of a transmitter unit 1 are connected according to the recursion rule r, and the bytes (or other data unit) are XORed, and shifted. Register 40 having taps defined by the recursion rule r may then be used to create encoded data. If the data unit chosen for register 40 is a byte, then register 40 would be ORDER number of bytes long, as would the initialization vector i. Initialization vector i is then loaded into register 40.

A byte of plaintext is passed to XOR unit 41 along with a byte from register 40 (or from the feedback to be shifted into the byte 1), a keytext byte. It doesn't matter which stage is used as long as it is the same for all bytes of the message. The third stage was chosen here.

This will result in a byte of cipher text which is passed to a front end which transmits the signal to an intended receiver 2.

At the receiver 2, the message is reduced to the ciphertext by conventional means and passed to XOR unit 51. XOR unit 51 also receives a byte in the third stage of a byte register 50, a keytext byte. Byte register 50 operates the same as byte register 40 in transmitter 1 described above.

The ciphertext byte is decoded by XORing the ciphertext with the keytext byte. If a message is XORed twice, the same message results.

Code Spreading

Figure 5:
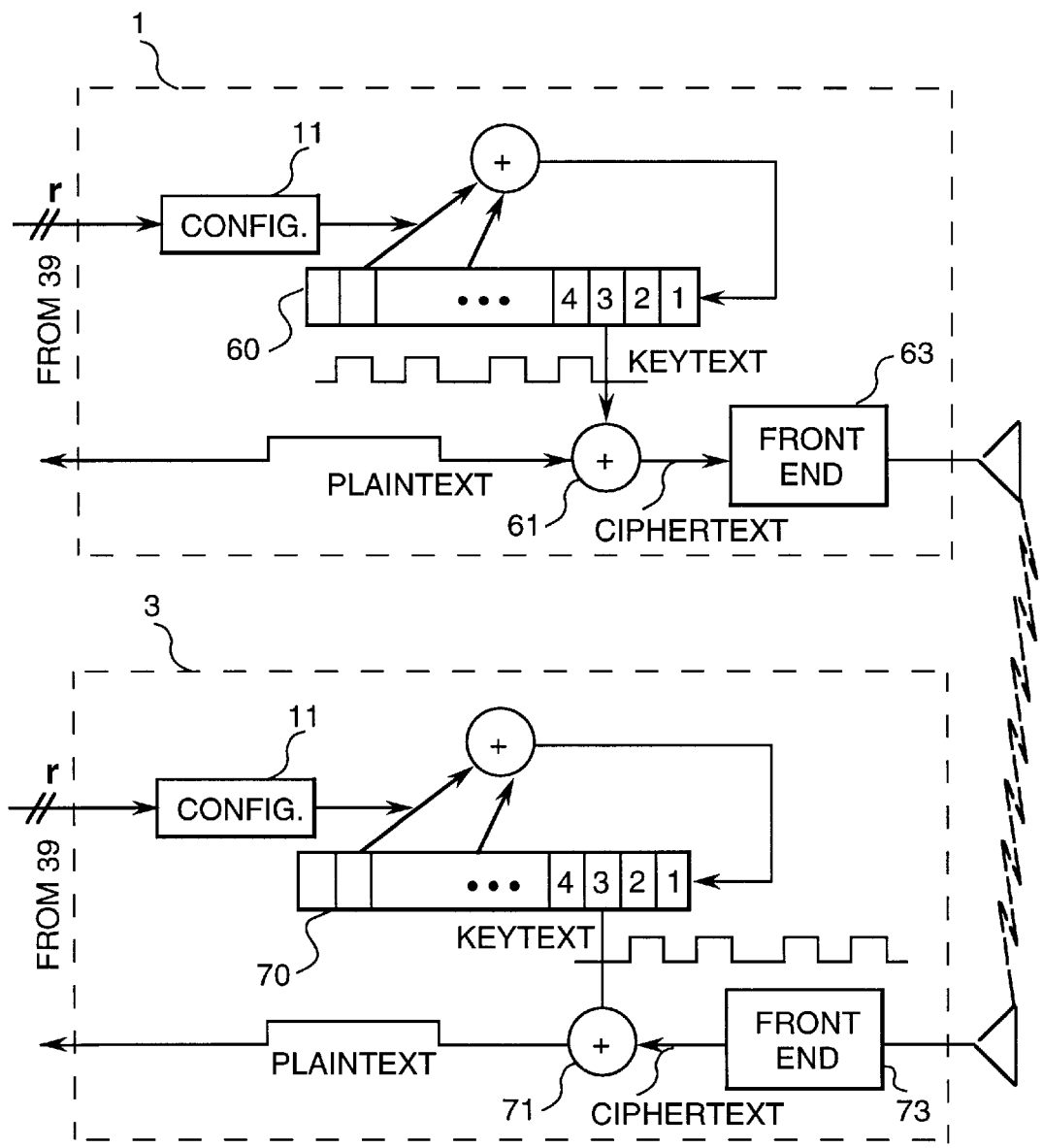
FIG. 5 is a simplified block diagram of a spread spectrum communication system according to the present invention.

In FIG. 5, a simplified block diagram of an implementation of a code spreading technique is shown. In this embodiment, a feedback bit register 60 is employed. The taps are set up according to the recursion rule r. A single stage, or the feedback bit, is passed to an XOR device 61 at a rate much higher than the message bits, or plain text is passed to XOR unit 61. This causes the plaintext to be chopped into much smaller "chips" which are transmitted by a front end device 63. The transmitted message has a bandwidth much greater than that of the data message if it were sent without spreading. This wider bandwidth signal is less likely to be corrupted by another nearby source transmitting at a similar frequency.

At a receiver 2, a front end device 73 converts the message back into chips, and provides them to an XOR device 61. This extracts the original plaintext message.

If the data rates of the keybits and plaintext bits of FIG. 5 are approximately the same rate, the system may be used as a simple secure data transmission system.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A method of configuring a linear feedback second shift register capable of producing a maximum length pseudorandom sequence comprising the steps of:

a) selecting a Mersenne prime integer, and 'ORDER', corresponding to a shift register length;

b) selecting a primitive polynomial having a largest exponent equal to ORDER;

c) simulating a linear feedback first shift register having ORDER number of stages, numbered from lowest stage to highest stage, with taps connected to stages of the first shift register having numbers corresponding to exponents of the primitive polynomial;

d) loading the first register with a predetermined initialization vector i;

e) performing a dot product of each bit of an arbitrary mask $m=(m_1, m_2, m_3, \ldots m_{ORDER})$ of length ORDER, having at least one non-zero bit from $m_2$ to $m_{ORDER}$, with each corresponding stage of the first shift register to result in a dot product bit $g_i$;

f) bit shifted out;

h) storing the modulo-2 adding the contents of stages connected to taps to produce a feedback bit;

g) shifting all bits of the first shift register to a higher stage with the highest stage feedback bit into the lowest stage;

i) repeating steps "e" to "h" for i=1 to ORDER no. of repetitions to create g=($g_1,g_2,g_3 \ldots g_{ORDER}$) dot product bits;

j) save $g_1$, as a first bit $f_j$;

k) load g into the first shift register;

l) repeating steps "e" to "j" for j=1 to 2* ORDER no. of times to result in f=($f_1,f_2,f_3 \ldots f_{2*ORDER}$) first bits;

m) solving the following simultaneous equations modulo-2 to determine a linear recursion rule vector r=($r_1,r_2,r_3, \ldots r_{ORDER}$):

$$\sum_{i=1}^{ORDER} r_i f_{i+j} = f_{j+ORDER+1}$$

n) configuring said second feedback shift register having ORDER number of stages, numbered from lowest stage to highest stage, with taps connected to stages of said second shift register having numbers corresponding to corresponding entry of the linear recursion rule vector with a "1" entry indicating a tap connected to that stage.

2. A secure data transmission device comprising:

a) a configurable first shift register having a plurality of stages equal to a Mersenne prime integer, the first shift register having configurable taps connected to stages, the first shift register capable of shifting contents of the stages, producing feedback, being a function of stages connected to taps, and storing the linear feedback into the lowest stage;

b) a configuration device coupled to the first shift register, operating to connect taps to stages of first shift register corresponding to a "1" in a linear recursive rule vector r provided to it, c) a mask device for storing a mask m having a plurality of bit places set to "1" or "0";

d) a configurable third shift register having a plurality of stages equal to a Mersenne prime integer and having configurable taps connected to stages, the third register capable of shifting contents of the stages, producing feedback, being a function of stages connected to taps, and storing the feedback into the lowest stage;

e) a loader connected to the third shift register, for loading a predetermined initialization vector i into the third shift register for an initial loading, and for loading dot products g=($g_1,g_2,g_3, \ldots g_{ORDER}$) into the third shift register after ORDER number of shifts;

f) dot product generator connected to the third shift register and the mask device for producing a dot product $g_i$ of m and third shift register contents b for each shift of the third shift register;

g) an initial bit buffer, functionally coupled to the dot product generator for receiving and storing a first dot product $g_1$ after each load of the third shift register as f=($f_1,f_2,f_3, \ldots f_{2*ORDER}$); and h) an equation calculation device for determining a linear recursion rule vector r from the first modulo-2 dot products f, and for providing the linear recursion rule vector r to the configuration device, for configuring the configurable first shift register;

i) an exclusive OR (XOR) device coupled to the first shift register for receiving the contents of a selected stage or the feedback, XORing it with a plaintext message desired to be transmitted to produce ciphertext;

j) a front end coupled to the XOR device, for receiving the ciphertext and transmitting it as a signal through a channel to a receiver.

3. The secure data transmission device of claim 2 wherein the first shift register and the XOR device are capable of operating at a faster rate than the rate which the plaintext message is received to produce a spread spectrum signal.

4. A secure data receiver device comprising:

a) a front end for receiving a signal transmitted over a channel and converting it to ciphertext;

b) a configurable second shift register having a plurality of stages equal to a Mersenne prime integer and having configurable taps connected to stages, the second register capable of shifting contents of the stages, producing feedback, being a function of stages connected to taps, and storing the feedback into the lowest stage;

c) a configuration device coupled to the second shift register, operating to connect taps to stages of second shift register corresponding to a "1" in a linear recursive rule vector r provided to it;

d) a mask device for storing a mask m having a plurality of bit places set to "1" or "0";

e) a configurable fourth shift register having a plurality of stages equal to a Mersenne prime integer and having configurable taps connected to stages, the fourth register capable of shifting contents of the stages, producing feedback, being a function of stages connected to taps, and storing the feedback into the lowest stage;

f) a loader connected to the fourth shift register, for loading a predetermined initialization vector i into the fourth shift register for an initial loading, and for loading dot products g=($g_1,g_2,g_3, g_{ORDER}$) into the fourth shift register after ORDER number of shifts;

g) dot product generator connected to the fourth shift register and the mask device for producing a dot product $g_i$ of m and fourth shift register contents b for each shift of the fourth shift register;

h) an initial bit buffer, functionally coupled to the dot product generator for receiving and storing a first dot product $g_1$ after each load of the fourth shift register as f=($f_1,f_2,f_3, \ldots f_{2*ORDER}$);

i) an equation calculation device for determining a recursion rule vector r from the first modulo-2 dot products f, and for providing the recursion rule vector r to the configuration device, for configuring the configurable second shift register; and j) an exclusive OR (XOR) device coupled to the second shift register for receiving the contents of a selected stage or the feedback, XORing it with the ciphertext message from the front end to produce a plaintext message.

5. The secure data transmission device of claim 4 wherein the second shift register and the XOR device are capable of operating at a faster rate than the rate which the ciphertext is received to decode a spread spectrum signal.

* * * * *